United States Patent [19]
Masutani

[11] Patent Number: 6,008,879
[45] Date of Patent: Dec. 28, 1999

[54] PHOTOGRAPH PROCESSOR

[75] Inventor: Hironori Masutani, Wakayama, Japan

[73] Assignee: Noritsu Koki Co., Ltd., Wakayama-ken, Japan

[21] Appl. No.: 09/051,556

[22] PCT Filed: Aug. 26, 1997

[86] PCT No.: PCT/JP97/02949

§ 371 Date: Apr. 13, 1998

§ 102(e) Date: Apr. 13, 1998

[87] PCT Pub. No.: WO98/09194

PCT Pub. Date: Mar. 5, 1998

[30] Foreign Application Priority Data

Aug. 26, 1996 [JP] Japan ................................ 8-224122

[51] Int. Cl.⁶ .................................................. G03B 27/52
[52] U.S. Cl. ................... 355/40; 355/40; 355/41; 355/27; 355/28; 355/29; 396/568; 396/570; 396/578; 396/612; 396/613

[58] Field of Search .................... 355/40, 41, 27, 355/28, 29; 396/568, 570, 578, 612, 613

[56] References Cited

U.S. PATENT DOCUMENTS

| 4,723,153 | 2/1988 | Kogane | 355/28 |
| 4,862,200 | 8/1989 | Hicks | 355/29 |
| 4,916,479 | 4/1990 | Ujiie | 355/28 |

*Primary Examiner*—Safet Metjahic
*Assistant Examiner*—Emily C. Jones
*Attorney, Agent, or Firm*—Jordan and Hamburg LLP

[57] ABSTRACT

Presence or absence of paper is detected by individual sensors and data content stored in a backup RAM is checked out at the time when an external power source begins to supply electric power, and paper feeding operation is automatically performed by a CPU in accordance with detected states and the stored data content.

15 Claims, 14 Drawing Sheets

PHOTOGRAPH PROCESSOR

BACKGROUND ART

The present invention pertains to a photographic processing system which processes a sensitized material by using an exposed film and, more particularly, relates to a photographic processing system which can process a sensitized material in a proper manner even when an instantaneous voltage drop has occurred.

Conventionally, a photographic processing system is widely used, in which photographic printing paper (hereinafter referred to as the paper) serving as a sensitized material is supplied from a magazine which houses the paper in the form of a roll, images recorded on a developed film are printed on the paper in a printing section, the exposed paper is subjected to a developing process in a developing section, the paper is then dried in a drying section, cut into individual frames of specified lengths and ejected. This photographic processing system incorporates a microcomputer which operates as a control means on electric power supplied from a commercial electric-utility system and controls such operations as paper transport and printing.

In the aforementioned conventional photographic processing system, if a source voltage supplied to the microcomputer drops down to its reset voltage due to an instantaneous voltage drop caused by a lightning strike to the commercial electric-utility system or overload conditions, for instance, the microcomputer will be reset when the source voltage returns to its normal level. Should this happen, the microcomputer would "restart" from an initialization process, detect a portion of paper already supplied from the magazine and judge that a paper jam status has occurred. In such cases, an operator had to open a cover of the photographic processing system and remove the whole paper in its inside to recover from the paper jam status, making the portion of paper previously supplied from the magazine, including already processed prints, completely useless.

The invention provides a solution to the aforementioned problem. Thus, it is an object of the invention to provide a photographic processing system which can process paper in a proper manner even when an instantaneous voltage drop has occurred.

SUMMARY OF THE INVENTION

To solve the aforementioned problem, the present invention has employed the following configurations.

Specifically, the invention as defined in claim 1 provides a configuration comprising a sensitized material storage for accommodating a sensitized material wound in the form of a roll, a printing section which runs on electric power supplied from an external power source to print photographed images recorded on an exposed film, sensitized material transport means which runs on the electric power supplied from the external power source to transfer the sensitized material from the sensitized material storage to the printing section and output the sensitized material exposed with the photographed images from the printing section, and sensitized material processing control means for processing the sensitized material in accordance with its state determined at the time when the electric power begins to be supplied from the external power source.

According to this configuration, the sensitized material is handled in accordance with its state determined at the time when the external power source begins to supply the electric power. Thus, it is possible to process the sensitized material in a proper manner depending on its state at the time when the electric power begins to be supplied even when a power failure, such as an instantaneous voltage drop, has occurred during operation.

The invention provides the above configuration further comprising feeding state judging means for judging the state of feeding of the sensitized material at the time when the external power source begins to supply the electric power, wherein the sensitized material processing control means controls the feeding of the sensitized material in accordance with the state of feeding of the sensitized material.

According to this configuration, the feeding of the sensitized material is controlled in accordance with its feeding state determined at the time when the external power source begins to supply the electric power. As a consequence, the sensitized material need not be removed by an operator even when it has already been supplied from the sensitized material storage at the time when the electric power begins to be supplied following a power failure, such as an instantaneous voltage drop, which has occurred during operation. This makes it possible to decrease loss of the sensitized material and improve labor efficiency.

The invention also provides the above configuration in which the feeding state judging means judges whether the leading edge of the sensitized material has already reached the printing section at the time when the external power source begins to supply the electric power, and the sensitized material processing control means returns the sensitized material back to the sensitized material storage if the leading edge of the sensitized material has not reached the printing section at the time when the electric power begins to be supplied.

According to this configuration, it is judged whether the leading edge of the sensitized material has already reached the printing section at the time when the electric power begins to be supplied, and if the leading edge of the sensitized material has not reached the printing section, the sensitized material is returned back to the sensitized material storage. As a consequence, the sensitized material is automatically used again from its leading edge even when it has already been supplied from the sensitized material storage at the time of power-up following a power failure, such as an instantaneous voltage drop, which has occurred during operation. This makes it possible to decrease loss of the sensitized material and improve labor efficiency, because the sensitized material need not be removed by an operator.

The invention also provides the above configuration in which the feeding state judging means judges whether the leading edge of the sensitized material has already reached the downstream side of the printing section at the time when the external power source begins to supply the electric power, and the sensitized material processing control means further advances the sensitized material by at least the length of its exposed portion if the leading edge of the sensitized material has already reached the downstream side of the printing section at the time when the electric power begins to be supplied.

According to this configuration, it is judged whether the leading edge of the sensitized material has already reached the downstream side of the printing section at the time when the electric power begins to be supplied, and if the leading edge of the sensitized material has already reached the downstream side of the printing section, the sensitized material is further advanced by at least the length of its exposed portion. This makes it possible to prevent double exposure of the sensitized material in a reliable manner.

The invention also provides the a configuration further comprising a memory for retaining stored data content even when the electric power is not supplied from the external power source, wherein sensitized material processing control means processes the sensitized material in accordance with the data content stored in the memory at the time when the external power source begins to supply the electric power.

According to this configuration, the sensitized material is processed in accordance with the data content stored in the memory at the time when the external power source begins to supply the electric power. This makes it possible to process the sensitized material in a proper manner in accordance with the data content stored in the memory even when a power failure, such as an instantaneous voltage drop, has occurred during operation.

The invention also provides a configuration further comprising cutting means provided on the downstream side of the printing section for cutting the sensitized material, cutting command means for issuing a command for a cutting operation, and data storage control means which writes a cutting command signal in the memory when the command for the cutting operation is issued and writes an end-of-cutting signal in the memory when the cutting operation of the sensitized material is finished, wherein the sensitized material processing control means cuts the sensitized material, outputs a cut downstream portion of the sensitized material, and returns a cut upstream portion of the sensitized material back to the sensitized material storage if the cutting command signal is stored and the end-of-cutting signal is not stored in the memory at the time when the external power source begins to supply the electric power, whereas the sensitized material processing control means outputs the cut downstream portion of the sensitized material and returns the cut upstream portion of the sensitized material back to the sensitized material storage if the cutting command signal and the end-of-cutting signal are stored in the memory at the time when the external power source begins to supply the electric power.

According to this configuration, the sensitized material is cut, the cut downstream portion of the sensitized material is output, and the cut upstream portion of the sensitized material is returned back to the sensitized material storage if the cutting command signal is stored and the end-of-cutting signal is not stored in the memory at the time when the electric power begins to be supplied, whereas the cut downstream portion of the sensitized material is output, and the cut upstream portion of the sensitized material is returned back to the sensitized material storage if both the cutting command signal and the end-of-cutting signal are stored in the memory at the time when the external power source begins to supply the electric power. This makes it possible to cut the sensitized material in a reliable manner even when a power failure, such as an instantaneous voltage drop, occurs after a command for a cutting operation has been issued but before completion of the cutting operation, so that loss of the sensitized material can be decreased. Furthermore, it becomes possible to improve labor efficiency because the sensitized material need not be removed by an operator.

The invention also provides a configuration further comprising feeding control means for further advancing the sensitized material by at least the length of its exposed portion when the command for the cutting operation is issued, wherein the data storage control means writes an end-of-feeding signal in the memory when a feeding operation by the feeding control means is also finished, and wherein the sensitized material processing control means cuts the sensitized material upon completion of the feeding operation by the feeding control means if the cutting command signal is stored in the memory, the end-of-cutting signal is not stored in the memory, and the end-of-feeding signal is not stored in the memory at the time when the external power source begins to supply the electric power.

According to this configuration, the sensitized material is cut after it has been advanced by the feeding control means by at least the length of its exposed portion if the cutting command signal is stored in the memory, the end-of-cutting signal is not stored in the memory, and the end-of-feeding signal is not stored in the memory at the time when the electric power begins to be supplied. In this configuration, it is possible to cut the exposed downstream portion of the sensitized material in a reliable manner even when a power failure, such as an instantaneous voltage drop, occurs after a command for a cutting operation has been issued but before the sensitized material is completely advanced. This makes it possible to decrease loss of the sensitized material.

BEST MODES OF CARRYING OUT THE INVENTION

Figure 14:
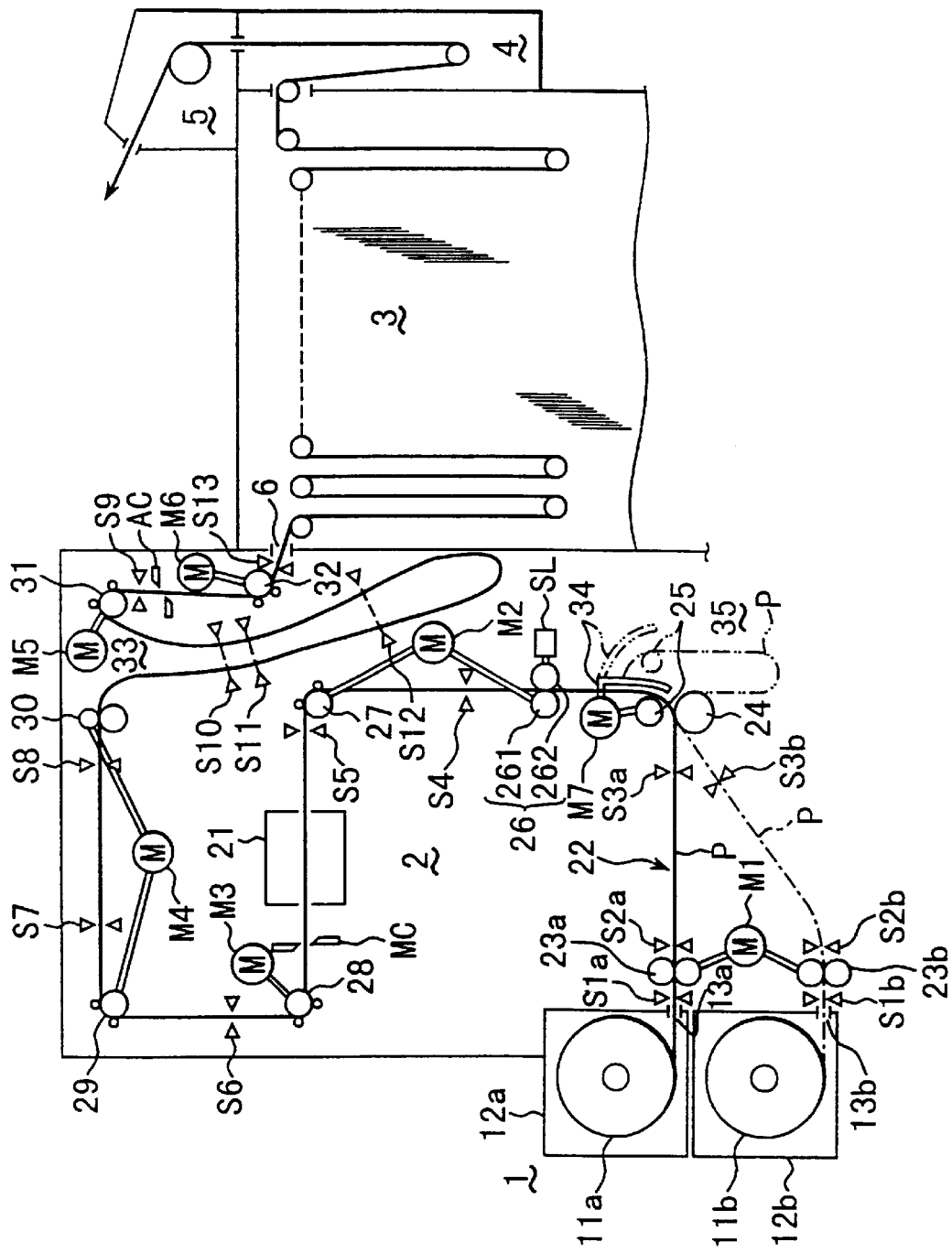
FIG. 14 is a constructional view of one embodiment of a photographic processing system according to the present invention.

FIG. 14 is a constructional view of one embodiment of a photographic processing system according to the present invention.

This photographic processing system comprises a paper storage section 1 provided at a lower-left part, a printing section 2 located above the paper storage section 1, a developing section 3 located to the right of the printing section 2, a drying section 4 located to the right of the developing section 3, and an output section 5 disposed above the drying section 4.

The paper storage section 1 includes magazines 11a and 11b for storing paper P wound in the form of a roll and casings 12a and 12b accommodating the magazines 11a and 11b, respectively, without allowing light to penetrate into the interior. Located approximately in the middle of the system, the printing section 2 includes a printing part 21 in which images recorded on a developed film are printed on the paper P and a paper feed path 22 provided with unillustrated transport guides for guiding the paper P from an opening 13a, 13b of the casing 12a, 12b to a boundary outlet 6 provided between the printing section 2 and the developing section 3 through the printing part 21.

The developing section 3 develops the paper P exposed with the images; the drying section 4 dries the paper P which has gone through a developing process; and the output section 5 cuts the dried paper P into specified lengths ejects cut frames one after another. The minimum transportable length of the developing section 3, or the minimum length of the paper P that can be fed by the developing section 3, is 550 mm.

Transport rollers for feeding the paper P are disposed along the aforementioned paper feed path 22 of the printing section 2. Specifically, there are provided, from the upstream side along a direction in which the paper P is fed, a pair of transport rollers 23a close to an opening 13a of the casing 12a, a pair of transport rollers 23b close to an opening 13b of the casing 12b, and guide rollers 24 and 25 for forming a later-described loop to the right of the transport roller pair 23a.

There are also provided a pair of transport rollers 26 above the guide roller 25, a transport roller 27 for altering the paper feeding direction to a horizontal direction toward the printing part 21 above the transport roller pair 26, a transport roller 28 for altering the feeding direction to an upward direction at the left of the printing part 21, and a transport roller 29 for altering the feeding direction to a horizontal direction above the transport roller 28.

Further, there are provided a pair of transport rollers 30 to the right of the transport roller 29, a transport roller 31 to the right of the transport roller pair 30, and a transport roller 32 for altering the feeding direction toward the boundary outlet 6 below the transport roller 31. There is formed a stock site 33 which serves as a space for holding the paper P in a slackened condition between the transport roller pair 30 and the transport roller 31.

The transport roller pair 26 includes a drive roller 261 and an idle roller 262 which are disposed facing each other on both sides of the paper feed path 22, with a pusher solenoid SL connected to the idle roller 262. When this pusher solenoid SL is turned on, it pushes the idle roller 262 against the drive roller 261, making it possible to feed the paper P. When it becomes off, the idle roller 262 is caused to be separated from the drive roller 261, leaving the paper P in a loose state.

Furthermore, the paper feed path 22 is associated with sensors arranged from its upstream side along the feeding direction of the paper P. Specifically, there are disposed a front sensor S1a between the opening 13a and the transport roller pair 23a, an end sensor S2a immediately to the right of the transport roller pair 23a, a front sensor S1b between the opening 13b and the transport roller pair 23b, and an end sensor S2b immediately to the right of the transport roller pair 23b.

There are further provided standby sensors S3a and S3b to the left of the guide roller 24, a loading sensor S4 above the transport rollers 26, a loading sensor S5 immediately to the left of the transport roller 27, a loading sensor S6 above the transport roller 28, a position sensor S7 to the right of the transport roller 29, a position sensor S8 to the left of the transport roller pair 30, and a cut mark sensor S9 downstream in the feeding direction of the transport roller 31.

Furthermore, stock sensors S10, S11 and S12 are disposed, from top to bottom, in the stock site 33. In addition, a ready sensor S13 is fitted between the transport roller 32 and the boundary outlet 6.

Each of the sensors S1a–S13 is formed of a photointerrupter which comprises a light emitter including an LED and an optical sensor including a phototransistor, for instance. The light emitter and the optical sensor face each other on both sides of the paper feed path 22. In this configuration, light emitted by the light emitter is transmitted and received by the optical sensor when the paper P is absent, whereas the light from the light emitter is interrupted when the paper P is present, making it possible to detect the presence or absence of the paper P.

The paper feed path 22 is further associated with a manual cutter MC located between the printing part 21 and the transport roller 28 as well as an automatic cutter AC immediately below the cut mark sensor S9.

The printing section 2 is further provided with a supply motor M1 for turning individual drive rollers of the transport roller pairs 23a and 23b, a loading motor M2 for turning the transport rollers 26 and 27, a transport motor M3 for turning the transport roller 28, a transport motor M4 for turning the transport rollers 29 and 30, a transport motor M5 for turning the transport roller 31, and a processor drive motor M6 for turning the transport roller 32. The transport motors M4 and M5 are stepping motors by which the amount the paper P supplied is controlled by the number of input drive pulses.

Further, a supply loop guide 34 and a loop guide drive motor M7 are disposed in the vicinity of the guide roller 25 of the paper feed path 22 and a loop forming site 35 is provided to the right of the guide roller 24. The guide roller 25 and the supply loop guide 34 are connected to a rotary shaft of the loop guide drive motor M7. The supply loop guide 34 serves to guide the paper P being transported, and the loop forming site 35 serves as a space for allowing the paper P supplied from the magazine 11a or 11b to be set in a slackened condition.

The loop guide drive motor M7 drives the guide roller 25 and the supply loop guide 34 to swing to positions shown by alternate long and two short dashed lines in the Figure. When the guide roller 25 swings, the paper P is brought to the slackened condition by its own weight as shown by the alternate long and two short dashed lines. This makes it possible to control the rotating speed of the supply motor M1 independently of the rotating speeds of the other motors M2–M6.

Figure 1:
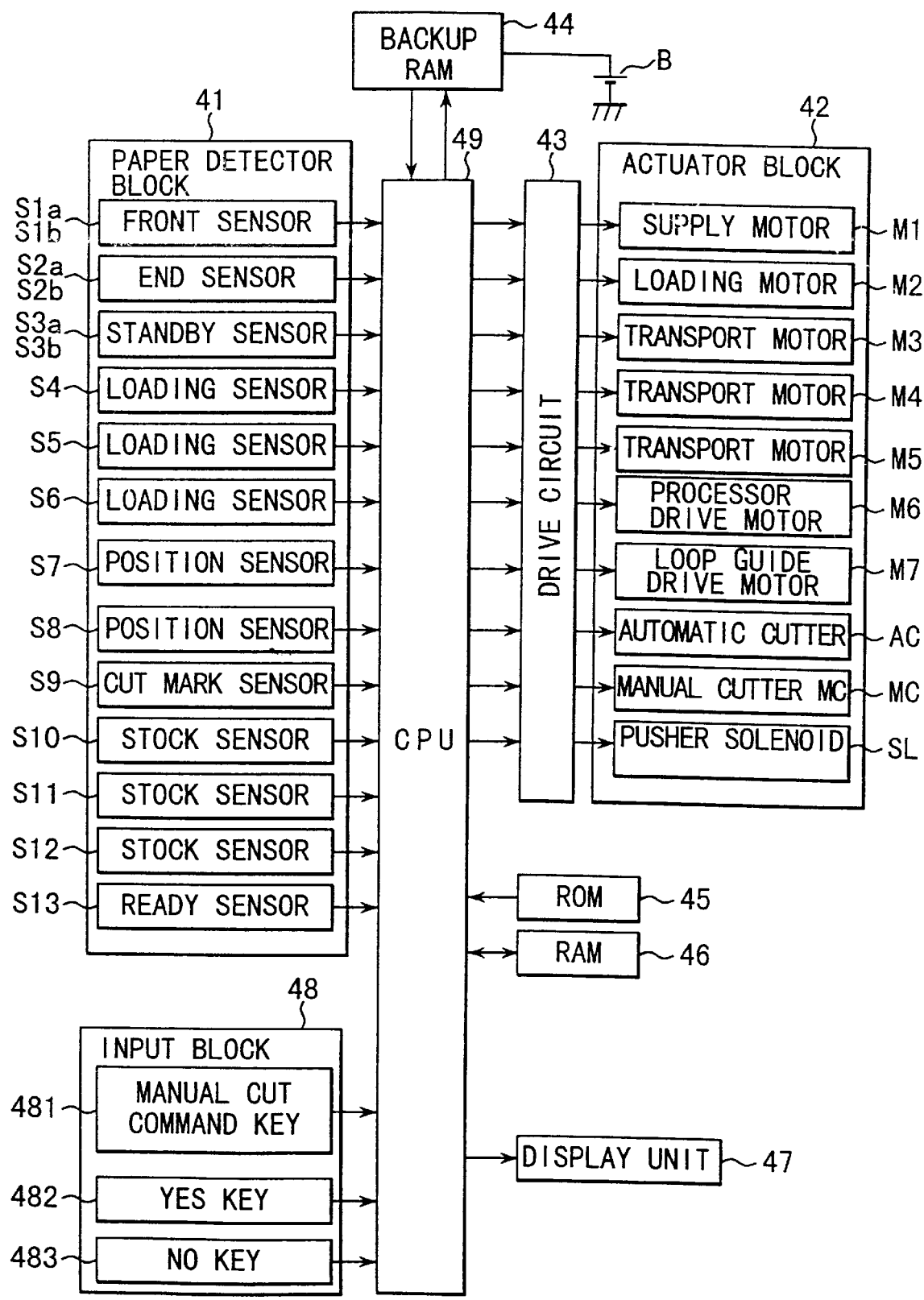
FIG. 1 is a block diagram showing a control system in one embodiment of a photographic processing system according to the present invention.

FIG. 1 is a block diagram showing a control system of the present photographic processing system.

The control system of this photographic processing system comprises a paper detector block 41, an actuator block 42, a drive circuit 43, a backup RAM 44, a ROM 45, a RAM 46, a display unit 47, an input block 48 and a CPU 49.

The paper detector block 41 includes of the aforementioned individual sensors S1a–S13. The actuator block 42 includes the aforementioned individual motors M1–M7, the individual cutters AC, MC and the pusher solenoid SL, and the drive circuit 43 supplies driving currents to the individual parts of the actuator block 42.

The backup RAM 44 is for storing specific data which is described below. A battery B is connected to the backup RAM 44 so that the stored data content is not lost during an electrical power failure. The ROM 45 serves to store a control program of this photographic processing system, print channel information concerning print size, such as panorama size and L size, as well as preset data, while the RAM 46 performs temporary data storage.

Mounted at an appropriate position on top of the system, the display unit 47 includes an LCD, for instance, to present messages described below to an operator. The input block 48 is positioned at an appropriate position on top of the system and includes a manual cut command key 481 for entering a command for manually cutting the paper P, a YES key 482 and a NO key 483 for selecting an instruction in response to each message presented on the display unit 47.

The CPU 49 controls overall operation of the system in accordance with the control program stored in the ROM 45. As described below, the CPU 49 controls feeding operation of the paper P at power-up by controlling individual parts according to statuses detected by the individual sensors of the paper detector block 41. The CPU 49 uses the backup RAM 44 to store the print channel information corresponding to currently used film size.

The CPU 49 also measures the length of the paper P transferred from the printing section 2 to the developing section 3 by counting the number of drive pulses fed to the transport motor M5 and drives the automatic cutter AC to cut the paper P each time the transferred length reaches a specified length (8 m in this embodiment).

Furthermore, the CPU 49 uses the backup RAM 44 to store specific information when conducting a manual cutting operation. Specifically, when a command for cutting the paper P is entered by using the manual cut command key 481, the CPU 49 uses the backup RAM 44 to store a cutter-on command signal at first and then feeds the paper P by a specified length corresponding to the print size required for advancing an exposed portion of the paper P to the downstream side of the manual cutter MC, or as much as the sum of the distance from the printing part 21 to the manual cutter MC and the length of the exposed portion of the paper P. When this paper feeding operation is completed, the backup RAM 44 is used to store an end-of-feeding signal, and upon completion of paper P cutting operation, the backup RAM 44 is used to store an end-of-cutting signal.

This photographic processing system is connected to a commercial power supply and incorporates an unillustrated direct current (DC) power supply which lowers the commercial mains voltage down to a specific voltage, rectifies and smooths it out. Electric power is supplied from this DC power supply to the circuit elements 41 to 43 and 45 to 49, excluding the backup RAM 44. When the source voltage supplied becomes equal to or lower than a specific reset voltage, the CPU 49 is reset.

Figure 2:
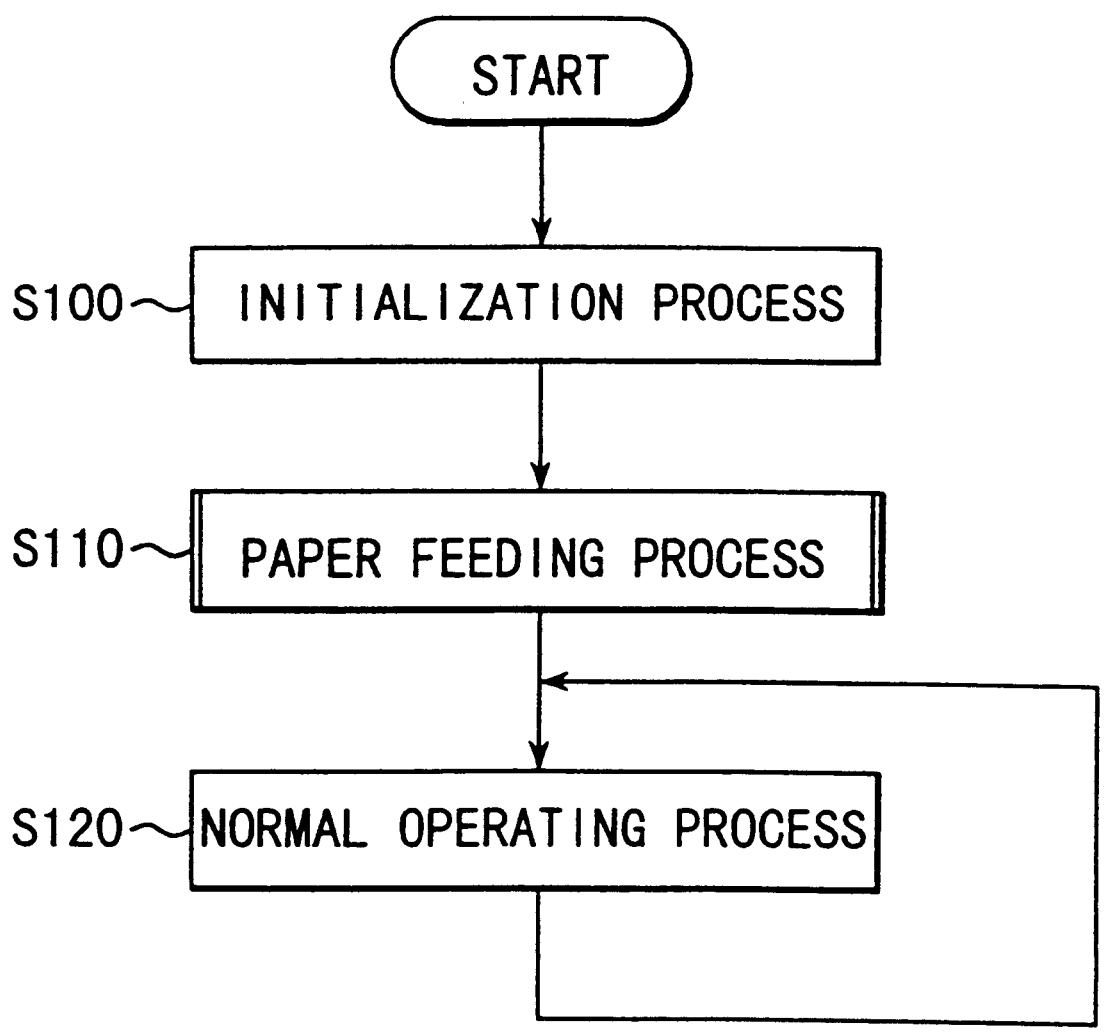
FIG. 2 is a flowchart depicting a main routine of operation according to the embodiment.

Operation of the photographic processing system is now described with reference to FIGS. 2 to 13. FIG. 2 is a flowchart depicting a main routine.

When the system is turned on, an initialization process is first carried out (step S100) including default value setup in the RAM 46, a paper feeding process described below is performed (step S110), and then a normal operating process is executed (step S120).

Figure 3:
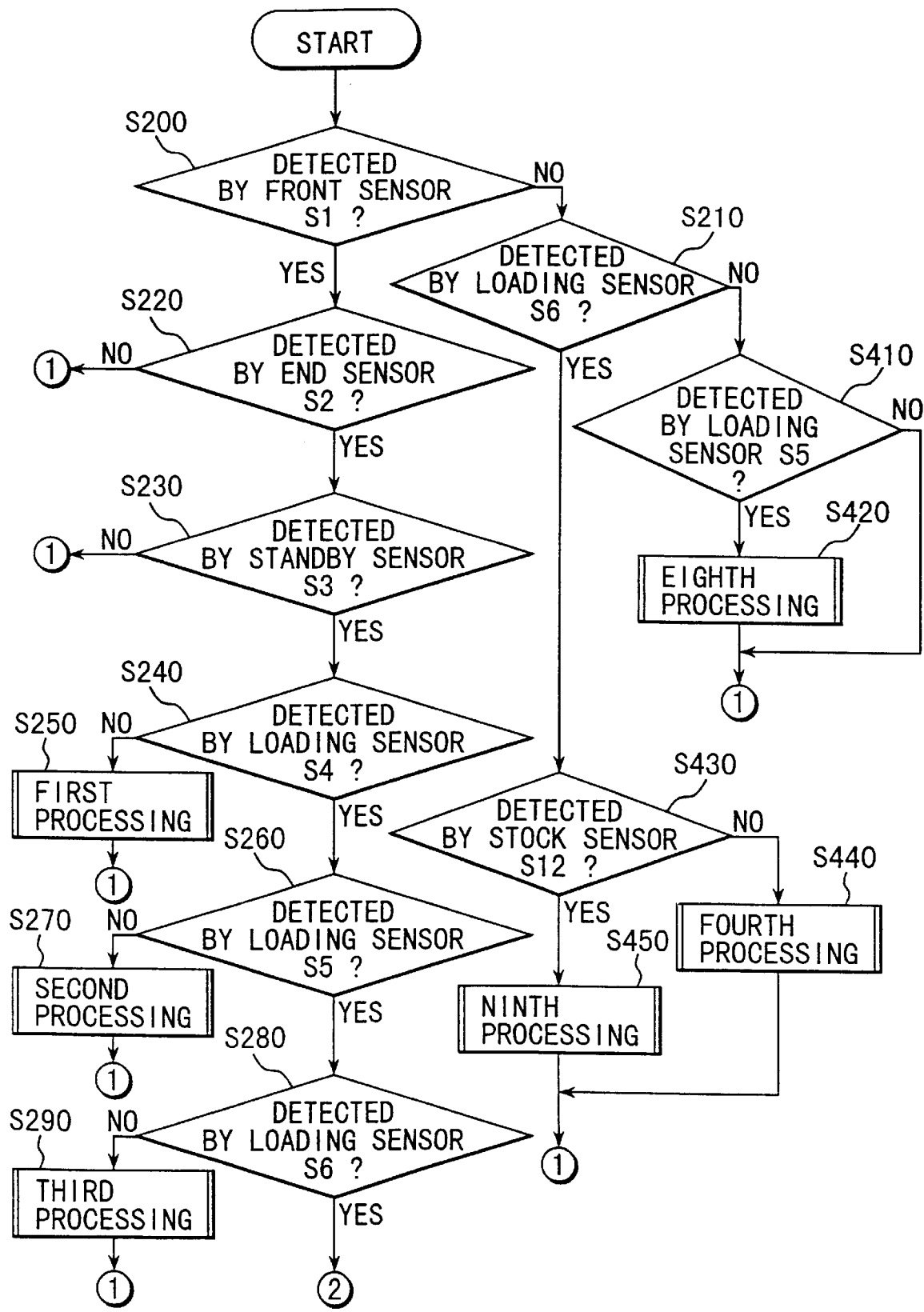
FIG. 3 is a flowchart depicting a paper feed processing subroutine of step S110 of FIG. 2.
Figure 4:
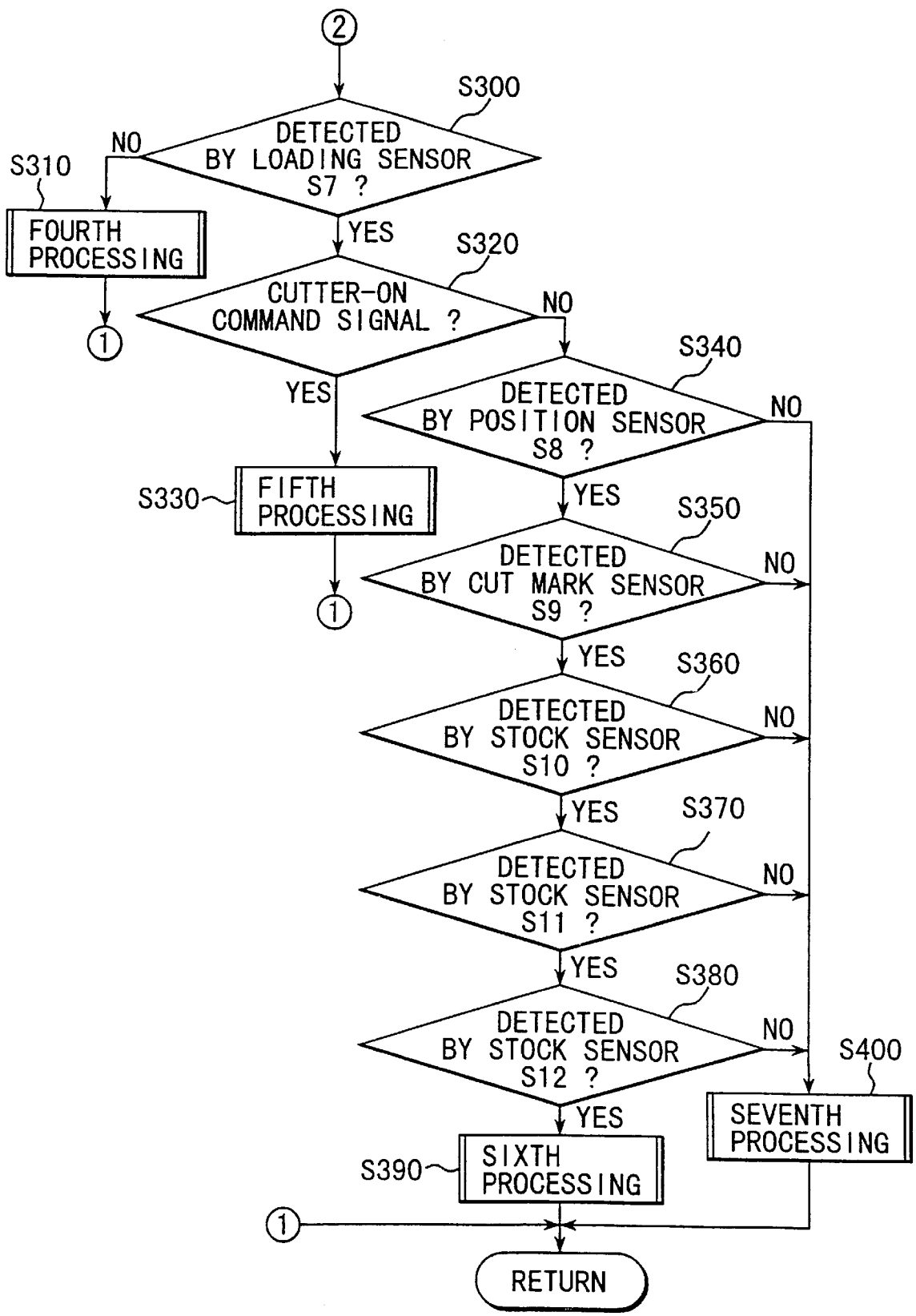
FIG. 4 is a flowchart depicting the paper feed processing subroutine of step S110 of FIG. 2.

FIGS. 3 and 4 are flowcharts depicting a paper feed processing subroutine of step S110 of FIG. 2.

For the sake of convenience in explaining the following flowcharts, the front sensor S1a and the front sensor S1b are each referred to as the front sensor S1, the end sensor S2a and the end sensor S2b are each referred to as the end sensor S2, and standby sensor S3a and the standby sensor S3b are each referred to as the standby sensor S3.

First, a judgment is made as to whether the paper P is currently detected by the front sensor S1 (step S200), and if it is not detected (NO in step S200), the operation flow proceeds to step S210.

On the other hand, if the paper P is detected in step S200 (YES in step S200), it is judged whether the paper P is currently detected by the end sensor S2 (step S220). If the paper P is not detected by the end sensor S2 (NO in step S220), it follows that only a leading edge portion of the paper P has been pulled out up to the front sensor S1. Since normal operation is possible in this condition, however, the subroutine is executed from this condition onward until it is finished.

On the other hand, if the paper P is detected in step S220 (YES in step S220), it is then judged whether the paper P is currently detected by the standby sensor S3 (step S230). If the paper P is not detected by the standby sensor S3 (NO in step S230), it follows that only the leading edge portion of the paper P has been pulled out up to the end sensor S2. Since normal operation is possible in this condition, however, the subroutine is executed from this condition onward until it is finished.

On the other hand, if the paper P is detected in step S230 (YES in step S230), it is then judged whether the paper P is currently detected by the loading sensor S4 (step S240). If the paper P is not detected (NO in step S240), this subroutine is finished upon proceeding to a later-described first processing subroutine (step S250).

If the paper P is detected in step S240 (YES in step S240), however, it is then judged whether the paper P is currently detected by the loading sensor S5 (step S260). If the paper P is not detected (NO in step S260), this subroutine is finished upon proceeding to a later-described second processing subroutine (step S270).

If the paper P is detected in step S260 (YES in step S260), however, it is then judged whether the paper P is currently detected by the loading sensor S6 (step S280). If the paper P is not detected (NO in step S280), this subroutine is finished upon proceeding to a later-described third processing subroutine (step S290).

If the paper P is detected in step S280 (YES in step S280), however, it is then judged whether the paper P is currently detected by the position sensor S7 (step S300). If the paper P is not detected (NO in step S300), this subroutine is finished upon proceeding to a later-described fourth processing subroutine (step S310).

If the paper P is detected in step S300 (YES in step S300), however, it is then judged whether a cutter-on command signal is stored in the backup RAM 44 (step S320). If it is stored (NO in step S320), this subroutine is finished upon proceeding to a later-described fifth processing subroutine (step S330).

If the cutter-on command signal is not stored in the backup RAM 44 instep S320 (NO in step S320), however, it is then judged whether the paper P is currently detected by the position sensor S8 (step S340). If the paper P is detected (YES in step S340), it is then judged whether the paper P is currently detected by the cut mark sensor S9 (step S350). If the paper P is detected (YES in step S350), it is then judged whether the paper P is currently detected by the stock sensor S10 (step S360). If the paper P is detected (YES in step S360), it is then judged whether the paper P is currently detected by the stock sensor S11 (step S370). If the paper P is detected (YES in step S370), it is then judged whether the paper P is currently detected by the stock sensor S12 (step S380). If the paper P is detected (YES in step S380), this subroutine is finished upon proceeding to a later-described sixth processing subroutine (step S390).

If the paper P is not detected in any of steps S340 to S380 (NO in any of steps S340–S380), this subroutine is finished upon proceeding to a later-described seventh processing subroutine (step S400).

In step S210, it is judged whether the paper P is currently detected by the loading sensor S6. If the paper P is not detected (NO in step S210), it is then judged whether the paper P is currently detected by the loading sensor S5 (step S410). If the paper P is not detected (NO in step S410), this subroutine is finished. If the paper P is detected (YES in step S410), this subroutine is finished upon proceeding to a later-described eighth processing subroutine (step S420).

On the other hand, if the paper P is detected by the loading sensor S6 (YES instep S210), it is then judged whether the paper P is currently detected by the stock sensor S12 (step S430). If the paper P is not detected (NO in step S410), this subroutine is finished upon proceeding to the later-described fourth processing subroutine (step S440).

On the other hand, if the paper P is detected by the stock sensor S12 (YES in step S430), this subroutine is finished upon proceeding to a later-described ninth processing subroutine (step S450).

Figure 5:
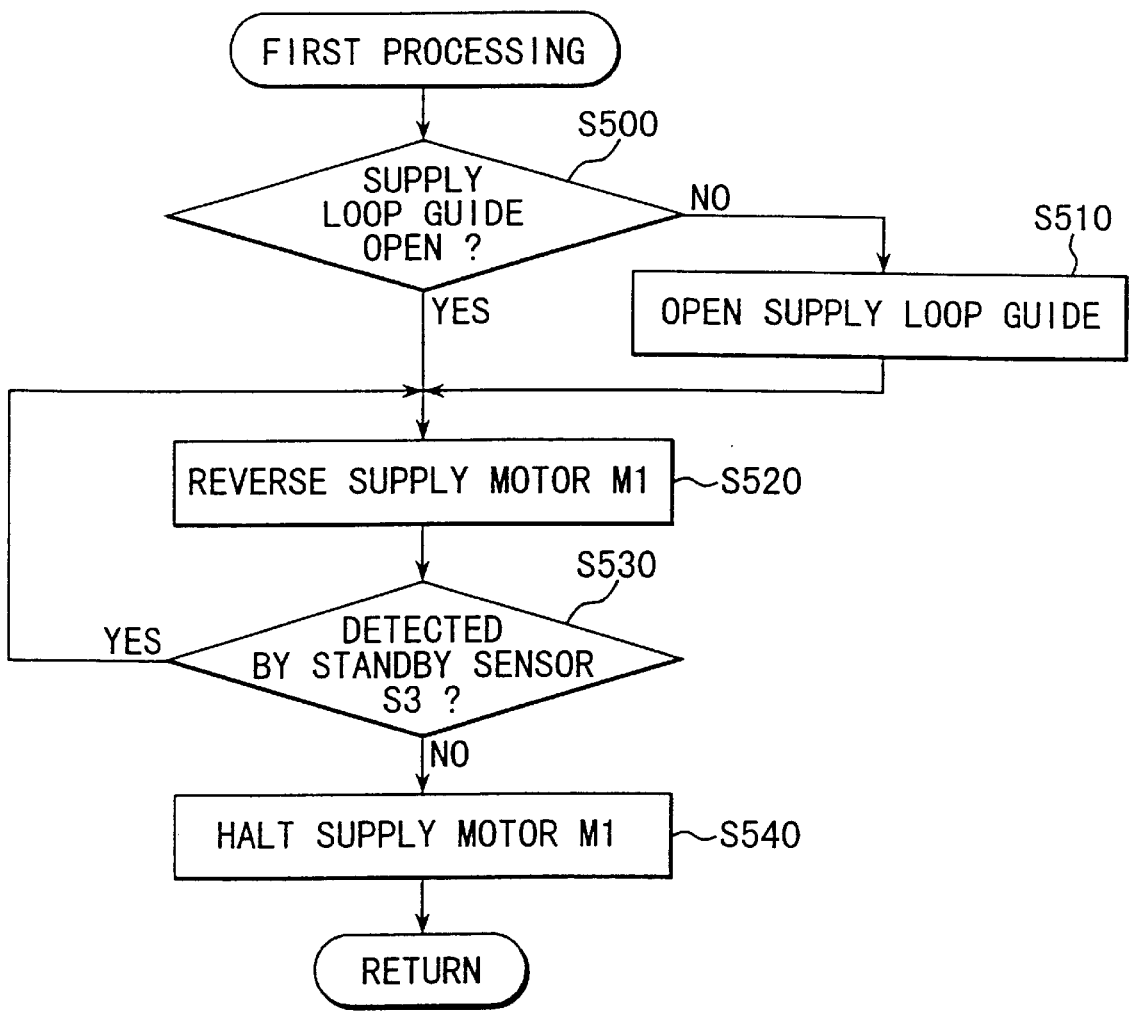
FIG. 5 is a flowchart depicting a first processing subroutine of step S250 of FIG. 3.

FIG. 5 is a flowchart depicting the first processing subroutine of step S250 of FIG. 3.

First, a judgment is made as to whether the supply loop guide 34 is in its open position (step S500), and if it is in the open position (YES in step S500), the operation flow proceeds to step S520. If the supply loop guide 34 is not in its open position (NO in step S500), however, the loop guide drive motor M7 is actuated to open the supply loop guide (step S510).

Next, the supply motor M1 is turned in its reversing direction (step S520) and it is judged whether the paper P is currently detected by the standby sensor S3 (step S530). As long as the paper P is detected (YES instep S530), the operation flow is returned to step S520 and the supply motor M1 is kept running in the reversing direction. When the paper P is no longer detected (NO in step S530), the supply motor M1 is halted (step S540) and this subroutine is finished.

When the operation flow has entered the first processing subroutine, the paper P has already been supplied up to such a point that its leading edge is just located between the standby sensor S3 and the loading sensor S4. The leading edge of the paper P is pulled back to the upstream side of the standby sensor S3 by the aforementioned steps, and the operation flow proceeds to the normal operating process. This makes it possible to use the paper P from its leading edge and thereby prevent loss of the paper P.

Figure 6:
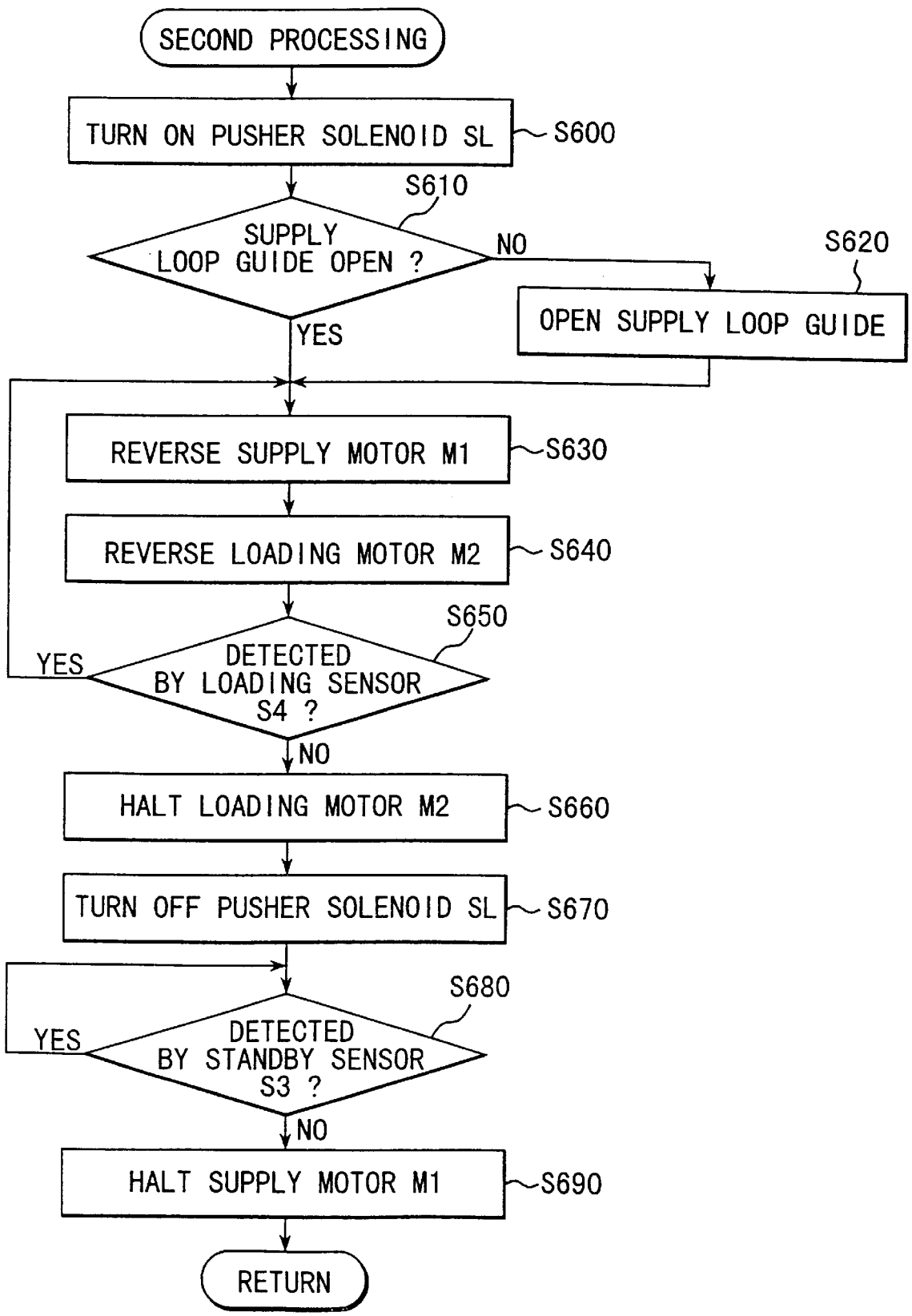
FIG. 6 is a flowchart depicting a second processing subroutine of step S270 of FIG. 3.

FIG. 6 is a flowchart depicting the second processing subroutine of step S270 of FIG. 3.

First, the pusher solenoid SL is set to an ON state so that the idle roller 262 is pressed against the drive roller 261 (step S600), and a judgment is made as to whether the supply loop guide 34 is in its open position (step S610). If it is in the open position (YES in step S610), the operation flow proceeds to step S630. If the supply loop guide 34 is not in its open position (NO in step S610), however, the loop guide drive motor M7 is actuated to open the supply loop guide 34 (step S620).

Subsequently, the supply motor M1 is turned in its reversing direction (step S630), the loading motor M2 is turned in its reversing direction (step S640), and it is judged whether the paper P is currently detected by the loading sensor S4 (step S650). As long as the paper P is detected (YES in step S650), the operation flow is returned to step S630 and the supply motor M1 and the loading motor M2 are kept running in the reversing direction. When the paper P is no longer detected (NO in step S650), the loading motor M2 is halted (step S660) and the pusher solenoid SL is turned off (step S670).

It is then judged whether the paper P is currently detected by the standby sensor S3 (step S680). As long as the paper P is detected (YES in step S680), a current state is maintained, that is, the supply motor M1 is kept running in its reversing direction. When the paper P is no longer detected (NO in step S680), the supply motor M1 is halted (step S690) and this subroutine is finished.

When the operation flow has entered the second processing subroutine, the paper P has already been supplied up to such a point that its leading edge is just located between the loading sensor S4 and the loading sensor S5. The leading edge of the paper P is pulled back to the upstream side of the standby sensor S3 by the aforementioned steps, and the operation flow proceeds to the normal operating process. This makes it possible to use the paper P from its leading edge and thereby prevent loss of the paper P.

Figure 7:
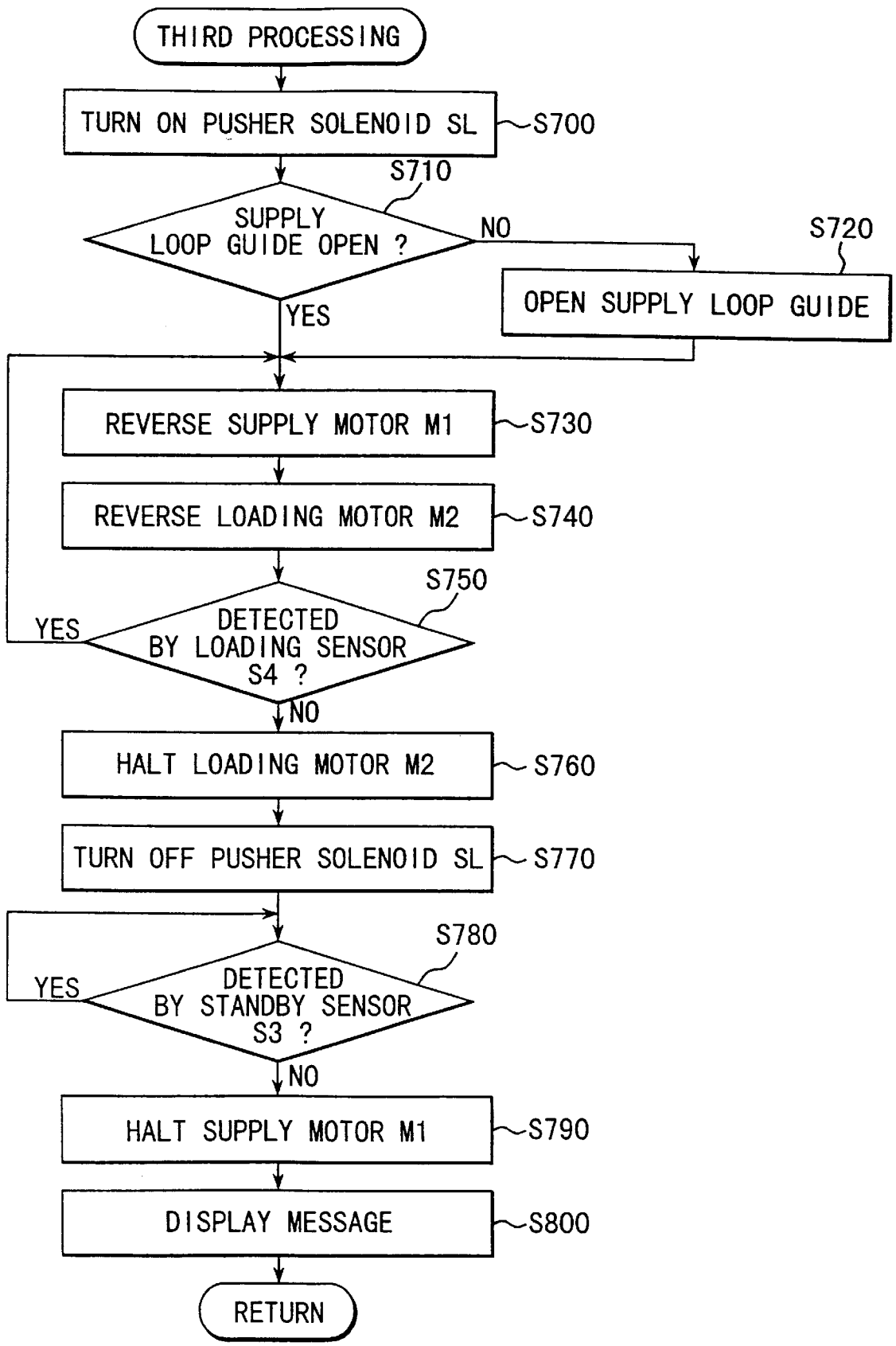
FIG. 7 is a flowchart depicting a third processing subroutine of step S290 of FIG. 3.

FIG. 7 is a flowchart depicting the third processing subroutine of step S290 of FIG. 3.

Description of steps S700 to S790 is omitted because they are same as steps S600 to S690.

Following step S790, a message is displayed prompting the operator to choose whether to perform a 680 mm (travel distance from the printing part 21 to the loading sensor S6) leading edge positioning operation to prevent double exposure (step S800) in a reliable manner, and this subroutine is finished.

The CPU 49 waits for a next command in the normal operating process (step S120 of FIG. 2) if the display unit 473 is pressed in response to the message displayed in step S800, whereas a leading edge positioning operation, in which the paper P is advanced by as much as 680 mm, is performed and the operation flow proceeds directly to a printing operation in the normal operating process (step S120 of FIG. 2) if the display unit 472 is pressed.

When the operation flow has entered the third processing subroutine, the paper P has already been supplied up to such a point that its leading edge is just located between the loading sensor S5 and the loading sensor S6. As a result of the aforementioned steps, the leading edge of the paper P is pulled back to the upstream side of the standby sensor S3 and the operation flow proceeds to the normal operating process, or the operation flow proceeds to the printing operation in the normal operating process with the paper P advanced by 680 mm from an exposure position. This makes it possible to use the paper P from its leading edge, or from a 680 mm position from the leading edge, at the operator's choice and thereby prevent loss of the paper P.

Figure 8:
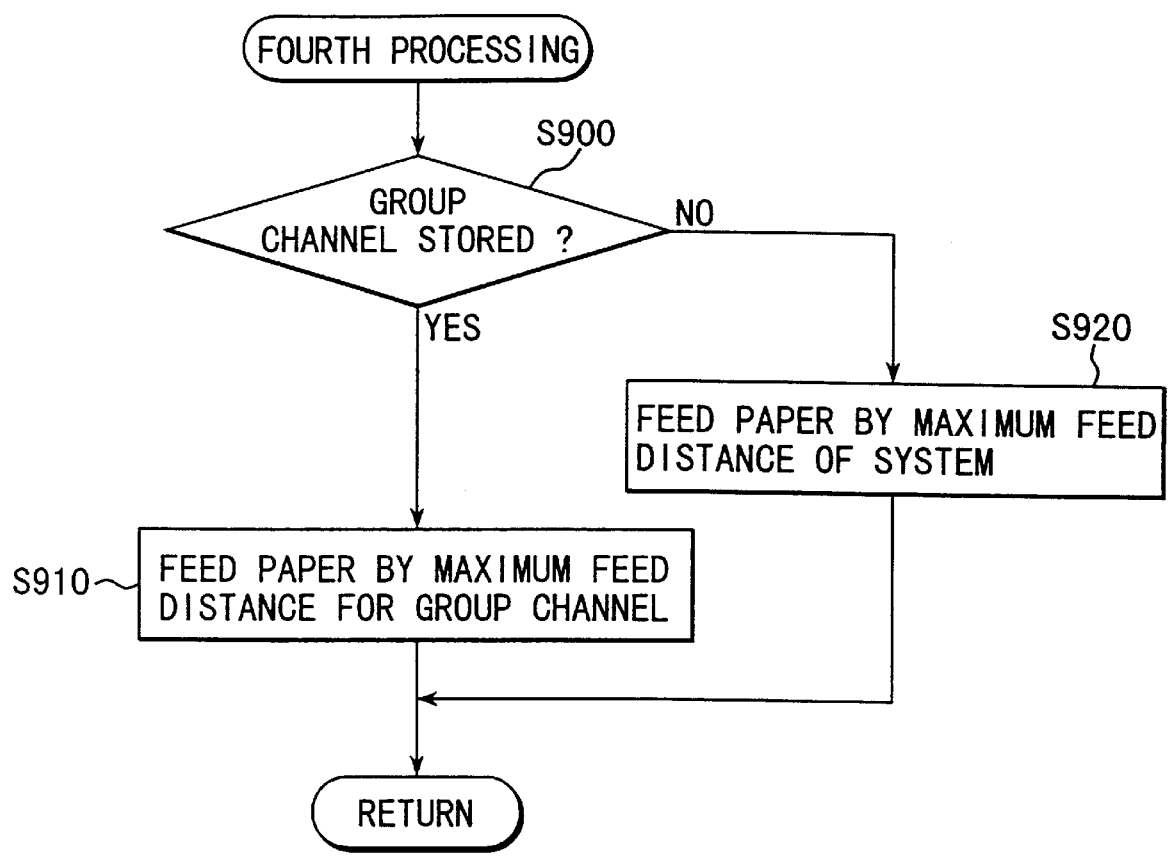
FIG. 8 is a flowchart depicting a fourth processing subroutine of step S310 of FIG. 4, and of step S440 of FIG. 3.

FIG. 8 is a flowchart depicting the fourth processing subroutine of step S310 of FIG. 4, and of step S440 of FIG. 3.

First, a judgment is made as to whether print channel information is stored in the backup RAM 44 (step S900). If it is stored (YES in step S900), the paper P is supplied by a maximum feed length (e.g., 254 mm for panorama size, 127 mm for L size) for a relevant print channel by actuating the loading motor M2 and the transport motors M3 and M4 and this subroutine is finished. If the print channel information is not stored in the backup RAM 44 (NO in step S900), however, the paper P is advanced by a maximum feed length (305 mm in this embodiment) of the system (step S920) and the subroutine is finished.

When the operation flow has entered the fourth processing subroutine shown in step S310 of FIG. 4, the paper P has already been supplied up to such a point that its leading edge is just located between the loading sensor S6 and the position sensor S7 so that a plurality of prints have already been completed.

In the case of step S440 of FIG. 3, however, the trailing edge of the paper P has already been sent out of the magazine 11a or 11b. Thus, the magazine is empty at this point and the paper P extends from upstream to downstream sides of the loading sensor S6, the amount of paper slack in the stock site 33 being such that a slack portion of the paper P is held above the stock sensor S12.

As a result of the aforementioned steps, the operation flow enters the normal operating process after the paper P has been advanced by the maximum feed length suitable for the relevant print size so that it is possible to prevent double exposure of already exposed areas in a reliable manner.

Figure 9:
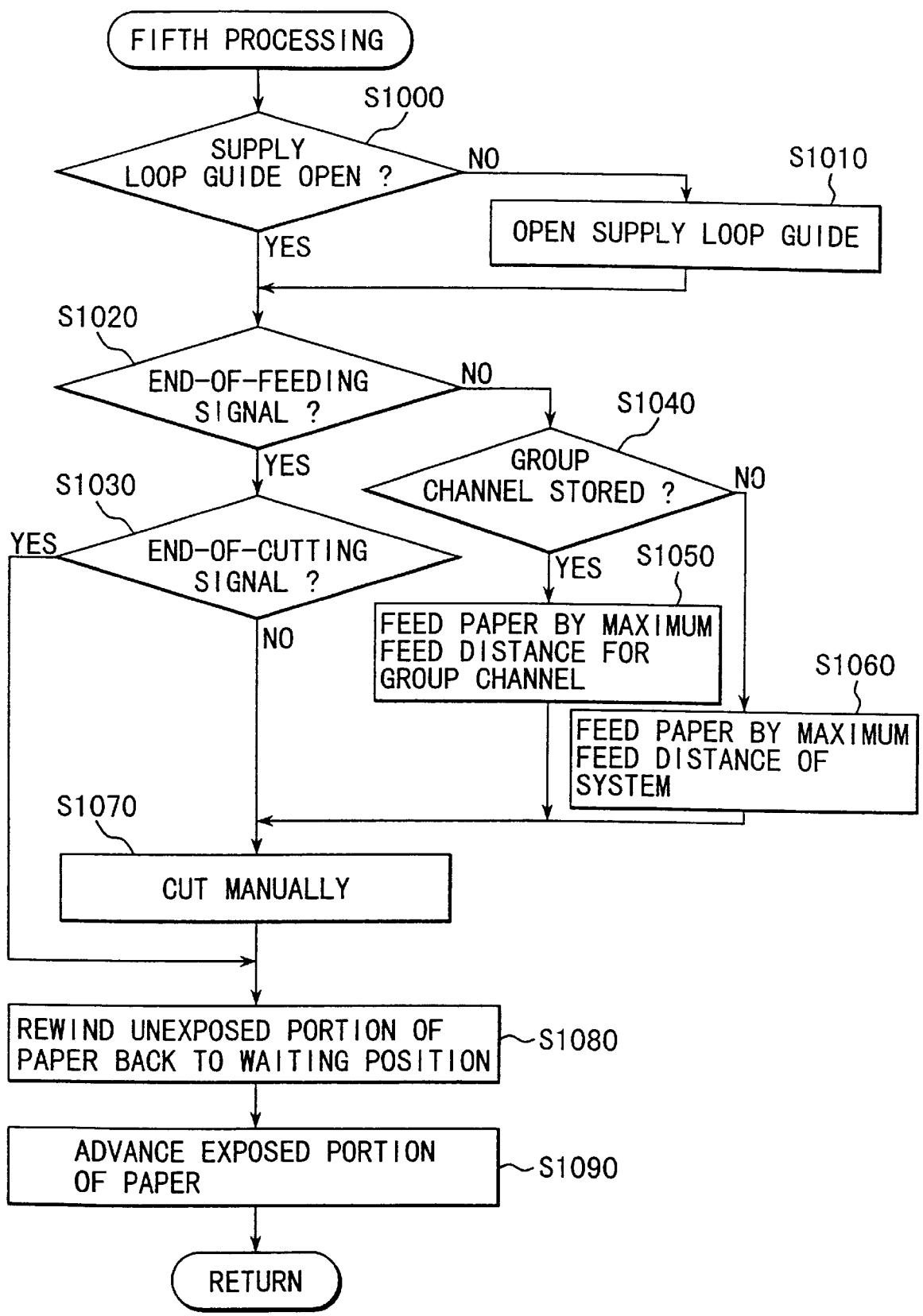
FIG. 9 is a flowchart depicting a fifth processing subroutine of step S330 of FIG. 4.

FIG. 9 is a flowchart depicting the fifth processing subroutine of step S330 of FIG. 4.

First, a judgment is made as to whether the supply loop guide 34 is in its open position (step S1000). If it is in the open position (YES in step S1000), the operation flow proceeds to step S1020. If, however, the supply loop guide 34 is not in its open position (NO in step S1000), the loop guide drive motor M7 is actuated to open the supply loop guide 34 (step S1010).

Next, it is judged whether an end-of-feeding signal, which indicates that feeding of the paper P has been completed after transmission of a cutter-on command signal, is stored in the backup RAM 44 (step S1020). If it is stored (YES in step S1020), the operation flow proceeds to step S1030.

If the end-of-feeding signal is not stored in the backup RAM 44 (NO in step S1020), however, it is further judged whether print channel information is stored in the backup RAM 44 (step S1040). If it is stored (YES in step S1040), the paper P is supplied by the maximum feed length (e.g., 254 mm for panorama size, 127 mm for L size) for the relevant print channel by actuating the loading motor M2 and the transport motors M3 and M4 and the operation flow proceeds to step S1070. If the print channel information is not stored in the backup RAM 44 (NO in step S1040), however, the paper P is advanced by the maximum feed length (305 mm in this embodiment) of the system (step S1060) and the operation flow proceeds to step S1070.

It is then judged whether an end-of-cutting signal is stored in the backup RAM 44 in step S1030, and if it is stored (YES in step S1030), the operation flow proceeds to step S1080. If the end-of-cutting signal is not stored in the backup RAM 44 (NO in step S1030), however, the paper P is manually cut by using the manual cutter MC (step S1070).

Subsequently, an upstream portion of the cut paper P on the upstream side of the manual cutter MC, or the unexposed portion of the paper P, is carried back to the upstream side of the standby sensor S3 by actuating the supply motor M1 and the loading motor M2 (step S1080) using the same procedure as the second processing subroutine (FIG. 6), and a downstream portion of the paper P on the downstream side of the manual cutter MC, or the exposed portion of the paper P, is advanced toward the developing section 3 by actuating the transport motors M3–M5 and the processor drive motor M6 (step S1090).

When the operation flow has entered the fifth processing subroutine, the paper P has already been supplied up to such a point that its leading edge is located on the downstream side of the position sensor S7 and the cutter-on command signal is stored in the backup RAM 44.

If the end-of-feeding signal is stored in the backup RAM 44 as a result of the aforementioned steps, the paper P may be cut at its current position, and if the end-of-feeding signal is not stored in the backup RAM 44, it is possible to cut the paper P exposed at the printing part 21 at its downstream side in a reliable manner by advancing the paper P by as much as the maximum feed length corresponding to the print size.

If both the end-of-cutting signal and the end-of-feeding signal are stored in the backup RAM 44, it is possible to prevent loss of the paper P by advancing the downstream portion of the cut paper P toward the developing section 3 and pulling back the upstream portion of the cut paper P so that its leading edge is located on the upstream side of the standby sensor S3.

Figure 10:
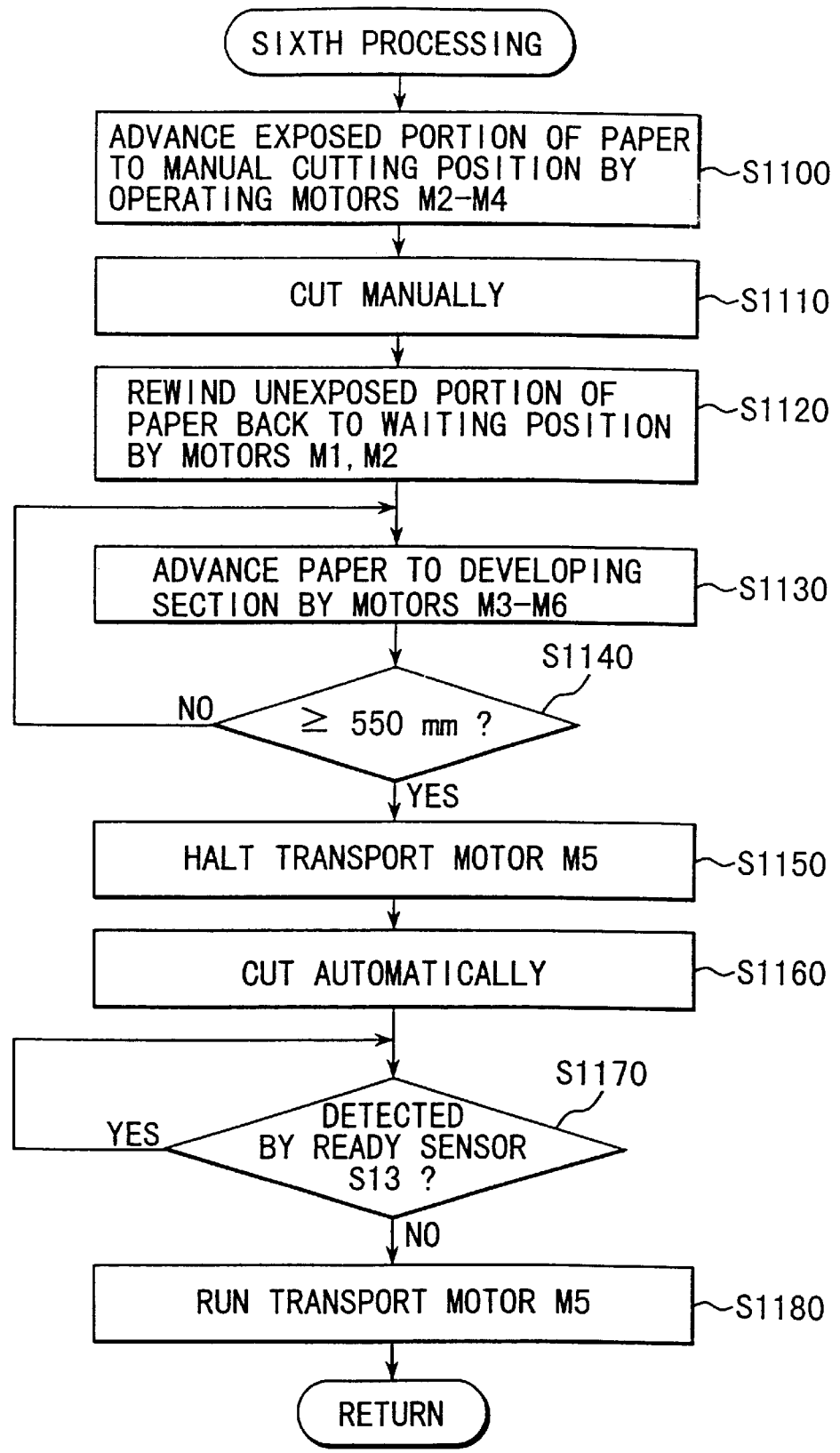
FIG. 10 is a flowchart depicting a sixth processing subroutine of step S390 of FIG. 4.

FIG. 10 is a flowchart depicting the sixth processing subroutine of step S390 of FIG. 4.

First, the exposed portion of the paper P is advanced up to the downstream side of a manual cutting position by actuating the loading motor M2 and the transport motors M3 and M4 and thereby feeding the paper P using the same procedure as steps S1040 to S1060 of FIG. 9 (step S1100), and then the paper P is manually cut by using the manual cutter MC (step S1110).

Subsequently, the upstream portion of the cut paper P on the upstream side of the manual cutter MC, or the unexposed portion of the paper P, is carried back to the upstream side of the standby sensor S3 by actuating the supply motor M1 and the loading motor M2 (step S1120) using the same procedure as the second processing subroutine (FIG. 6), and the downstream portion of the paper P on the downstream side of the manual cutter MC, or the exposed portion of the paper P, is advanced toward the developing section 3 by actuating the transport motors M3–M5 and the processor drive motor M6 (step S1130).

The operation flow is returned to step S1130 and the paper feeding process is continuously executed until the paper P is advanced by as much as 550 mm toward the developing section 3 (NO in step S1140). When the paper P has been advanced by 550 mm (YES in step S1140), the transport motor M5 is once halted (step S1150) and then the automatic cutter AC is actuated to perform an automatic cutting operation (step S1160).

Next, it is judged whether the paper P is currently detected by the ready sensor S13 (step S1170). As long as the paper P is detected (YES in step S1170), the system is maintained in the same running condition. When the paper P is no longer detected (NO in step S1170) after the paper P has been advanced by the actuated processor drive motor M6, the transport motor M5 is rerun (step S1180) and this subroutine is finished.

When the operation flow has entered the sixth processing subroutine, the paper P has been supplied up to such a point that it is slackened down to a lower portion of the stock site 33 and the leading edge of the paper P has been advanced to the upstream side of the cut mark sensor S9. This means that an instantaneous voltage drop has occurred while the paper P was being fed toward the developing section 3.

As a result of the aforementioned steps, it is possible to manually cut the paper P exposed at the printing part 21 at its downstream side in a reliable manner and prevent loss of the paper P by pulling back the upstream portion of the cut paper P so that its leading edge is located on the upstream side of the standby sensor S3.

It is also possible to resume measurement of each specified paper length (8 m in this embodiment) to be automatically cut by performing the automatic cutting operation after feeding the paper P by 550 mm which is a minimum feed length of the developing section 3.

Figure 11:
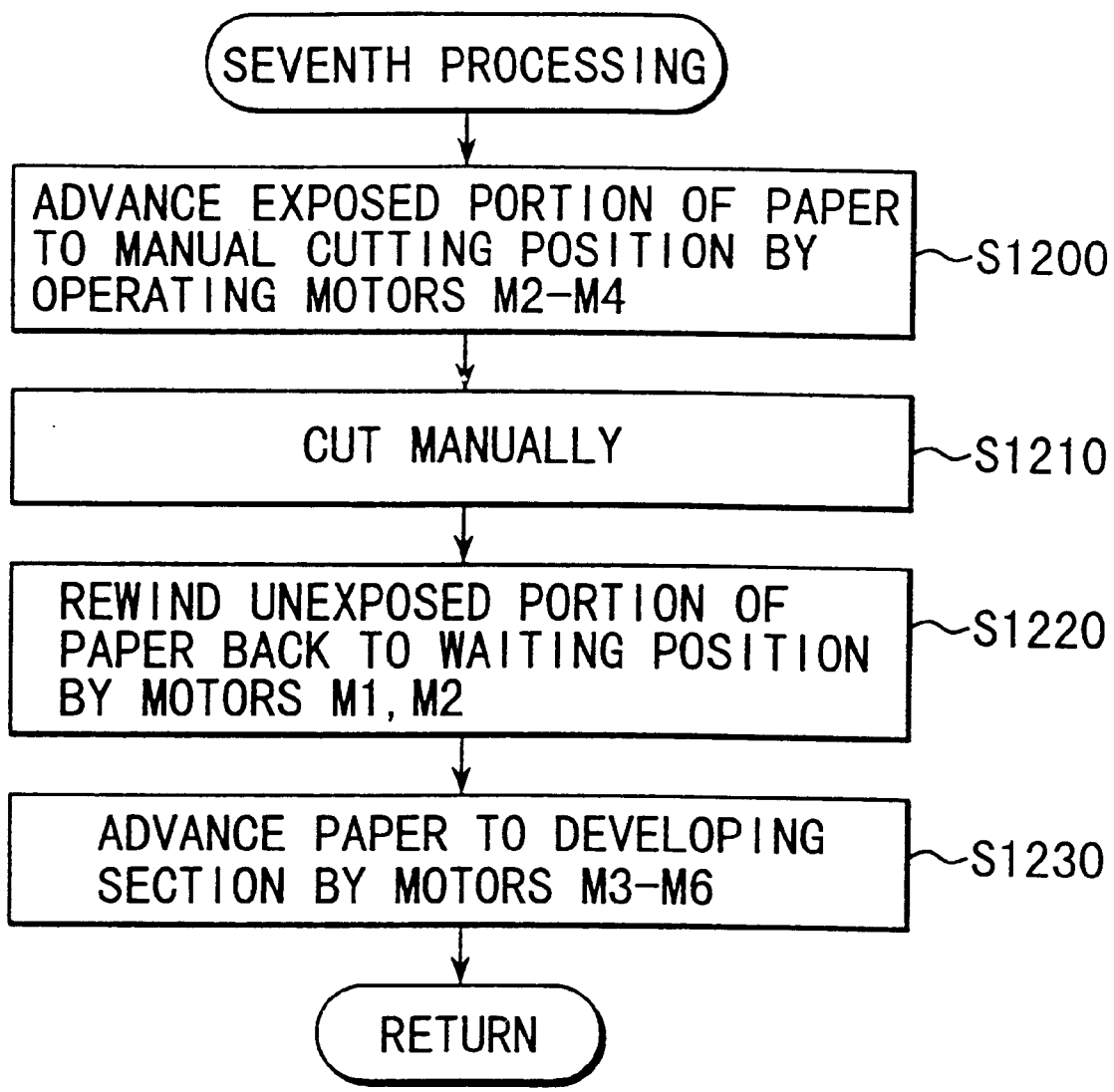
FIG. 11 is a flowchart depicting a seventh processing subroutine of step S400 of FIG. 4.

FIG. 11 is a flowchart depicting the seventh processing subroutine of step S400 of FIG. 4.

Description of steps S1200 to S1220 is omitted because they are same as steps S1100 to S1120 of FIG. 10.

Following step S1220, the downstream portion of the paper P on the downstream side of the manual cutter MC, or the exposed portion of the paper P, is advanced toward the developing section 3 by actuating the transport motors M3–M5 and the processor drive motor M6 (step S1230) and this subroutine is finished.

When the operation flow has entered the seventh processing subroutine, the paper P has already been supplied up to such a point that its leading edge is just located between the position sensor S7 and the cut mark sensor S9. As a result of the aforementioned steps, it is possible to manually cut the paper P exposed at the printing part 21 at its downstream side in a reliable manner and prevent loss of the paper P by pulling back the upstream portion of the cut paper P so that its leading edge is located on the upstream side of the standby sensor S3.

Figure 12:
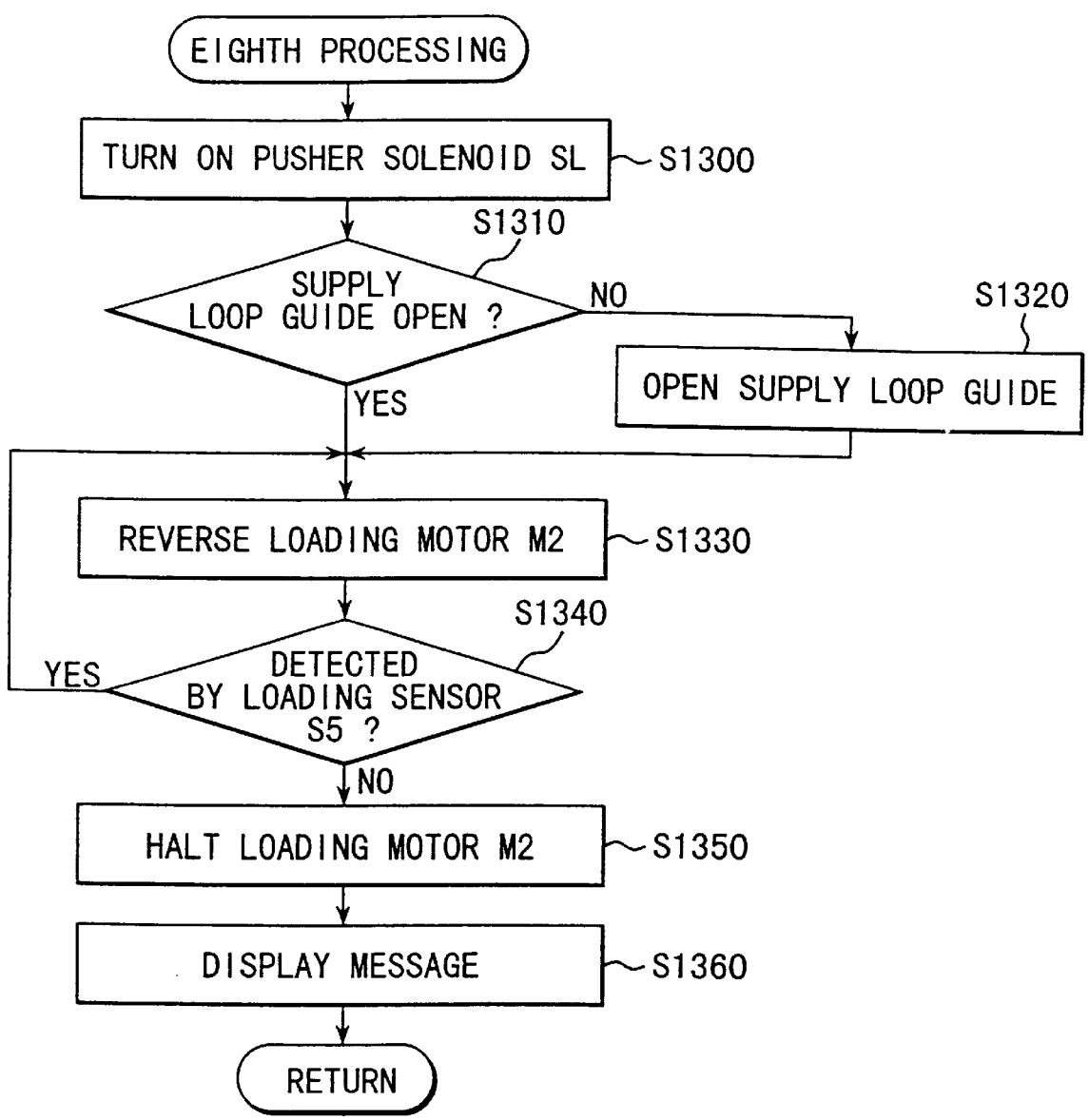
FIG. 12 is a flowchart depicting an eighth processing subroutine of step S420 of FIG. 3.

FIG. 12 is a flowchart depicting the eighth processing subroutine of step S420 of FIG. 3.

Description of steps S1300 to S1320 is omitted because they are same as steps S600 to S620 of FIG. 6.

Following step S1320, the loading motor M2 is turned in its reversing direction (step S1330), and it is judged whether the paper P is currently detected by the loading sensor S5 (step S1340). As long as the paper P is detected (YES in step S1340), the operation flow is returned to step S1330 and the loading motor M2 is kept running in the reversing direction. When the paper P is no longer detected (NO in step S1340), the loading motor M2 is halted (step S1350) and the operation flow proceeds to step S1360.

Description of step S1360 is omitted because it is same as step S800 of FIG. 7.

As is the case with step S800 of FIG. 7, the CPU 49 waits for a next command in the normal operating process (step S120 of FIG. 2) if the display unit 473 is pressed in response to the message displayed in step S1360, whereas a leading edge positioning operation, in which the paper P is advanced by as much as 680 mm, is performed and the operation flow proceeds directly to a printing operation in the normal operating process (step S120 of FIG. 2) if the display unit 472 is pressed.

When the operation flow has entered the eighth processing subroutine, the paper P has already been supplied up to such a point that the trailing edge of the paper P has already been sent out of the magazine 11a or 11b and, thus, the magazine is empty and the paper P extends from upstream to downstream sides of the loading sensor S5 at this point. It is therefore impossible to carry back the paper P to the upstream side of the developing section 3. It is however possible to use the paper P from its leading edge, or from a 680 mm position from the leading edge, at the operator's choice and thereby prevent loss of the paper P.

Figure 13:
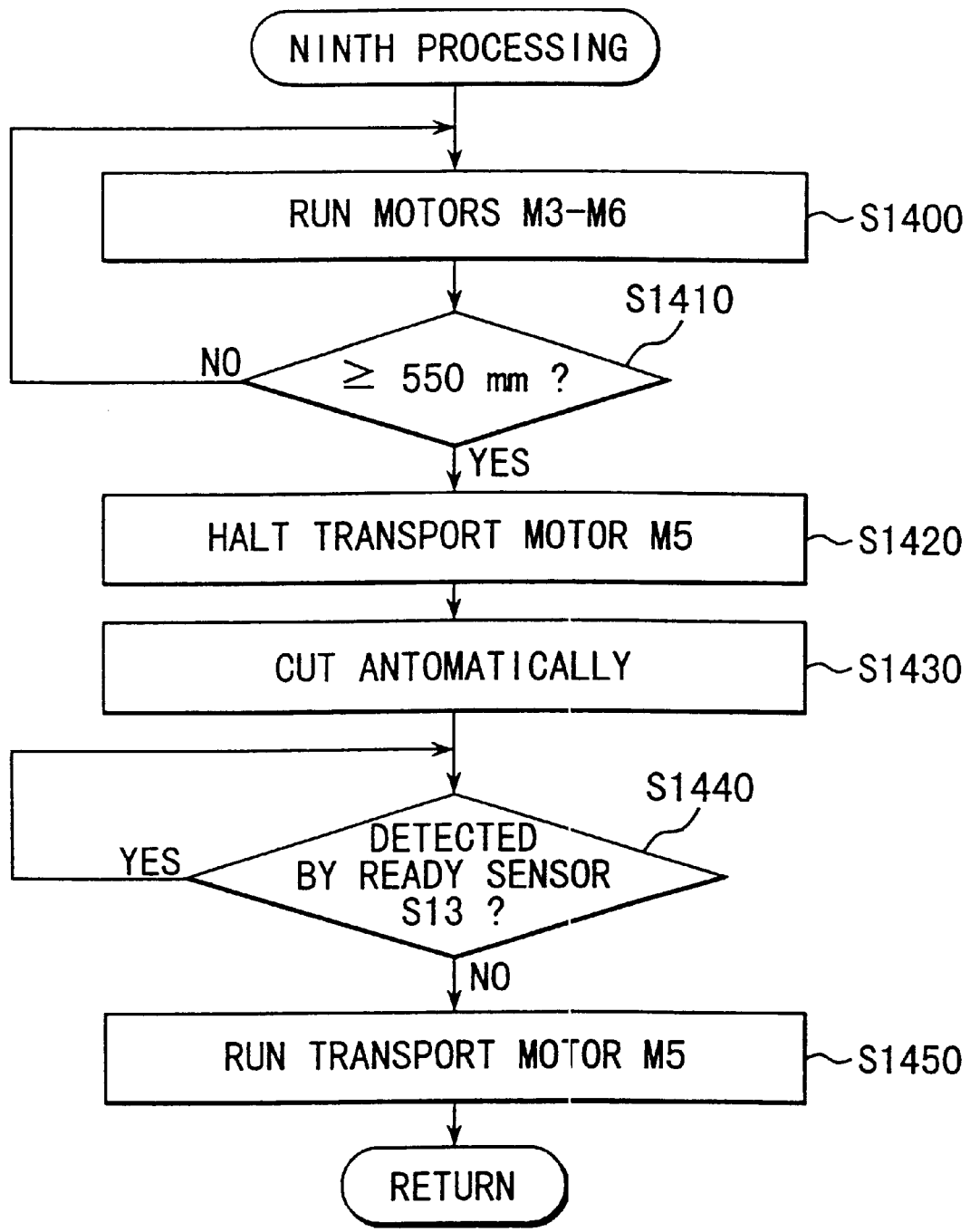
FIG. 13 is a flowchart depicting a ninth processing subroutine of step S450 of FIG. 3.

FIG. 13 is a flowchart depicting the ninth processing subroutine of step S450 of FIG. 3.

First, the paper P is advanced toward the developing section 3 by actuating the transport motors M3–M5 and the processor drive motor M6 (step S1400).

The operation flow is returned to step S1400 and the paper feeding process is continuously executed until the paper P is advanced by as much as 550 mm toward the developing section 3 (NO in step S1410). When the paper P has been advanced by 550 mm (YES in step S1410), the transport motor M5 is once halted (step S1420) and then the automatic cutter AC is actuated to perform an automatic cutting operation (step S1430).

Next, it is judged whether the paper P is currently detected by the ready sensor S13 (step S1440). As long as the paper P is detected (YES in step S1440), the system is maintained in the same running condition. When the paper P is no longer detected (NO in step S1440) after the paper P has been advanced by the actuated processor drive motor M6, the transport motor M5 is rerun (step S1450) and this subroutine is finished.

When the operation flow has entered the ninth processing subroutine, the trailing edge of the paper P has already been sent out of the magazine 11a or 11b. Thus, the magazine is empty and the paper P extends from upstream to downstream sides of the loading sensor S6 at this point and is slackened down to the position of the stock sensor S12 of the stock site 33.

As a result of the aforementioned steps, it is possible to perform a succeeding printing operation by performing the automatic cutting operation after feeding the paper P by 550 mm which is the minimum feed length of the developing section 3 and then returning to the normal operating process. This makes it possible to prevent loss of the paper P.

As so far described, presence or absence of the paper P is detected by the individual sensors S1a–S13 and the data content stored in the backup RAM 44 is checked out at power-up, and the paper P feeding operation is automatically carried out by the CPU 49 in accordance with detected states and the stored data content. With this arrangement, operator intervention is not required and the paper P is not wasted. It is therefore possible to improve both labor efficiency and the efficiency of use of the paper P.

As the foregoing embodiment comprises two magazines 11a and 11b, there may be provided a switching device for automatically switching from one magazine to the other when one of the magazines runs out of the paper P or for switching between different types or different widths of paper P in order to lighten the work load required for replacing the magazine and thereby improve the labor efficiency. It is to be noted that the number of magazines is not limited to two, but there may be provided three or more magazines.

In situations where the operation flow enters the first processing subroutine (FIG. 5). the second processing subroutine (FIG. 6), the third processing subroutine (FIG. 7), the fifth processing subroutine (FIG. 9) or the eighth processing subroutine (FIG. 12), the supply loop guide 34 should normally be in its open position. However, there are provided steps for judging whether the supply loop guide 34 is open and open it if it is not open yet. This arrangement makes it possible to set the supply loop guide 34 to its open position in a reliable manner when the source voltage returns to its normal level after an instantaneous voltage drop.

A rewritable, nonvolatile memory, such as a flash memory or EEPROM (electrically erasable and programmable read only memory) in place of the backup RAM 44 and the battery B.

INDUSTRIAL APPLICABILITY

As described in the foregoing, this invention can be effectively used as a photographic processing system which can process a sensitized material in a proper manner even in the event of an instantaneous voltage drop in an industrial field in which the sensitized material is processed by using an exposed film.

I claim:

1. A photographic processing system for processing sensitized material by exposure to photographed images on exposed film using electric power from an external power source subsequent to prior operation of the photographic processing system, comprising:

a sensitized material magazine for accommodating a sensitized material;

a printing section which runs on the electric power supplied from the external power source to print the photographed images recorded on the exposed film;

sensitized material transport means which runs on the electric power supplied from said external power source to feed the sensitized material from said sensitized material magazine to said printing section and to output the sensitized material, exposed with said photographed images, from said printing section; and sensitized material processing control means for processing said sensitized material in accordance with a state of operation of the photographic processing system, as a result of the prior operation, determined at a time when the electric power begins to be supplied from said external power source.

2. The photographic processing system as recited in claim 1, further comprising:

feeding state judging means for judging a state of feeding of said sensitized material by said sensitized material transport means including positioning of the sensitized material within the photographic processing system at the time when said external power source begins to supply the electric power as a portion of said state of operation; and wherein said sensitized material processing control means controls the feeding of said sensitized material by said sensitized material transport means in accordance with the state of feeding of said sensitized material.

3. A photographic processing system for processing sensitized material by exposure to photographed images on exposed film using electric power from an external power source subsequent to prior operation of the photographic processing system, comprising:

a sensitized material magazine for accommodating a sensitized material;

a printing section which runs on the electric power supplied from the external power source to print the photographed images recorded on the exposed film;

sensitized material transport means which runs on the electric power supplied from said external power source to feed the sensitized material between said sensitized material magazine and said printing section and to output the sensitized material, exposed with said photographed images, from said printing section;

sensitized material processing control means for processing said sensitized material in accordance with a state of operation of the photographic processing system, as a result of the prior operation, determined at a time when the electric power begins to be supplied from said external power source wherein said sensitized material processing control means controls the feeding of said sensitized material by said sensitized material transport means in accordance with the state of operation, which includes a state of feeding of said sensitized material, when the electric power begins to be supplied from said external power source;

feeding state judging means for judging the state of feeding of said sensitized material by said sensitized material transport means including positioning of the sensitized material within the photographic processing system at the time when said external power source begins to supply the electric power, said feeding state judging means judging whether a leading edge of said sensitized material has already reached said printing section at the time when said external power source begins to supply the electric power; and said sensitized material processing control means including means for controlling said sensitized material transport means to return said sensitized material back toward said sensitized material magazine if the leading edge of said sensitized material has not reached said printing section at the time when the electric power begins to be supplied as determined.

4. The photographic processing system as recited in claim 2, wherein:

said feeding state judging means judges said state of feeding including whether a leading edge of said sensitized material is disposed at a downstream side of said printing section at the time when said external power source begins to supply the electric power; and said sensitized material processing control means includes means for controlling said sensitized material transport means to advance said sensitized material by at least a length of an exposed portion of said sensitized material if the state of operation includes the leading edge of said sensitized material being disposed at the downstream side of said printing section at the time when the electric power begins to be supplied.

5. The photographic processing system as recited in claim 1, further comprising:

a memory for storing state of operation data even when the electric power is not supplied from said external power source; and said sensitized material processing control means processing said sensitized material in accordance with the state of operation data stored in said memory by reading said memory to determine said state of operation at the time when said external power source begins to supply the electric power.

6. A photographic processing system for processing sensitized material by exposure to photographed images on exposed film using electric power from an external power source subsequent to prior operation of the photographic processing system, comprising:

a sensitized material magazine for accommodating a sensitized material;

a printing section which runs on the electric power supplied from the external power source to print the photographed images recorded on the exposed film;

sensitized material transport means which runs on the electric power supplied from said external power source to feed the sensitized material between said sensitized material magazine and said printing section and to output the sensitized material, exposed with said photographed images, from said printing section;

sensitized material processing control means for processing said sensitized material in accordance with a state of operation of the photographic processing system, including positioning of the sensitized material as a result of the prior operation, determined at a time when the electric power begins to be supplied from said external power source;

a memory for storing state of operation data even when the electric power is not supplied from said external power source;

said sensitized material processing control means processing said sensitized material in accordance with the state of operation data stored in said memory by reading said memory to determine said state of operation at the time when said external power source begins to supply the electric power;

cutting means, provided on a downstream side of said printing section, for cutting said sensitized material in a cutting operation;

cutting command means for issuing a cutting command to said cutting means for effecting the cutting operation;

data storage control means for writing a cutting command signal in said memory when the cutting command for the cutting operation is issued and for writing an end-of-cutting signal in said memory when the cutting operation of said sensitized material is finished;

said sensitized material processing control means including means for controlling the cutting command means to issue the cutting command to effect the cutting operation on said sensitized material, and for controlling the sensitized material transport means to output a cut downstream portion of said sensitized material resulting from the cutting operation and to return a cut upstream portion of said sensitized material back toward said sensitized material magazine if said cutting command signal is stored and said end-of-cutting signal is not stored in said memory at the time when said external power source begins to supply the electric power; and said sensitized material processing control means including means for controlling the sensitized material transport means to output the cut downstream portion of said sensitized material and to return the cut upstream portion of said sensitized material back toward said sensitized material magazine if said cutting command signal and said end-of-cutting signal are stored in said memory at the time when said external power source begins to supply the electric power.

7. The photographic processing system as recited in claim 6, further comprising:

said sensitized material processing means including feeding control means for advancing said sensitized material by at least a length of an exposed portion when the command for the cutting operating is issued to permit cutting of the exposed portion;

said data storage control means writing an end-of-feeding signal in said memory when a feeding operation by said feeding control means is finished; and said sensitized material processing control means controlling the cutting command means to effect cutting of said sensitized material upon completion of the feeding operation by said feeding control means if said cutting command signal is stored in said memory, said end-of-cutting signal is not stored in said memory, and said end-of-feeding signal is not stored in said memory at the time when said external power source begins to supply the electric power.

8. The photographic processing system as recited in claim 3, wherein said state of feeding includes said sensitized material being advanced from said sensitized material magazine in addition to the leading edge of said sensitized material having not reached said printing section at the time when the electric power begins to be supplied.

9. The photographic processing system as recited in claim 2, wherein said feeding state judgment means includes sensors for detecting a physical presence of the sensitized material and means for interpreting output of said sensors to ascertain said state of feeding.

10. The photographic processing system as recited in claim 3, wherein said feeding state judgment means includes sensors for detecting a physical presence of the sensitized material and means for interpreting output of said sensors to ascertain said state of feeding.

11. The photographic processing system as recited in claim 4, wherein said feeding state judgment means includes sensors for detecting a physical presence of the sensitized material and means for interpreting output of said sensors to ascertain said state of feeding.

12. The photographic processing system as recited in claim 5, further comprising:

feeding state judging means for judging a state of feeding of said sensitized material by said sensitized material transport means including positioning of the sensitized material within the photographic processing system at the time when said external power source begins to supply the electric power as a portion of said state of operation;

said sensitized material processing control means controlling the feeding of said sensitized material by said sensitized material transport means in accordance with the state of feeding of said sensitized material; and said feeding state judgment means including sensors for detecting a physical presence of the sensitized material and means for interpreting output of said sensors to ascertain said state of feeding.

13. The photographic processing system as recited in claim 6, further comprising:

feeding state judging means for judging a state of feeding of said sensitized material by said sensitized material transport means including positioning of the sensitized material within the photographic processing system at the time when said external power source begins to supply the electric power as a portion of said state of operation;

said sensitized material processing control means controlling the feeding of said sensitized material by said sensitized material transport means in accordance with the state of feeding of said sensitized material; and said feeding state judgment means including sensors for detecting a physical presence of the sensitized material and means for interpreting output of said sensors to ascertain said state of feeding.

14. A photographic processing system for processing sensitized material by exposure to photographed images on exposed film using electric power from an external power source subsequent to prior operation of the photographic processing system, comprising:

a sensitized material magazine for accommodating a sensitized material;

a printing section which runs on the electric power supplied from the external power source to print the photographed images recorded on the exposed film;

sensitized material transport means which runs on the electric power supplied from said external power source to feed the sensitized material from said sensitized material magazine to said printing section and in a reverse direction from said printing section to said sensitized material magazine and to output the sensitized material, exposed with said photographed images, from said printing section; and sensitized material processing control means for processing said sensitized material by controlling said sensitized material transport means in accordance with a state of operation of the photographic processing system, as a result of the prior operation, determined at a time when the electric power begins to be supplied from said external power source.

15. The photographic processing system as recited in claim 14, further comprising:

feeding state judging means for judging a state of feeding of said sensitized material by said sensitized material transport means including positioning of the sensitized material within the photographic processing system at the time when said external power source begins to supply the electric power as a portion of said state of operation;

said sensitized material processing control means controlling the feeding of said sensitized material by said sensitized material transport means in accordance with the state of feeding of said sensitized material; and said feeding state judgment means including sensors for detecting a physical presence of the sensitized material and means for interpreting output of said sensors to ascertain said state of feeding.

* * * * *